Oct. 17, 1933.  H. L. PETERS  1,930,535
MECHANICAL BRAKE EQUALIZER
Filed May 21, 1930   2 Sheets-Sheet 1
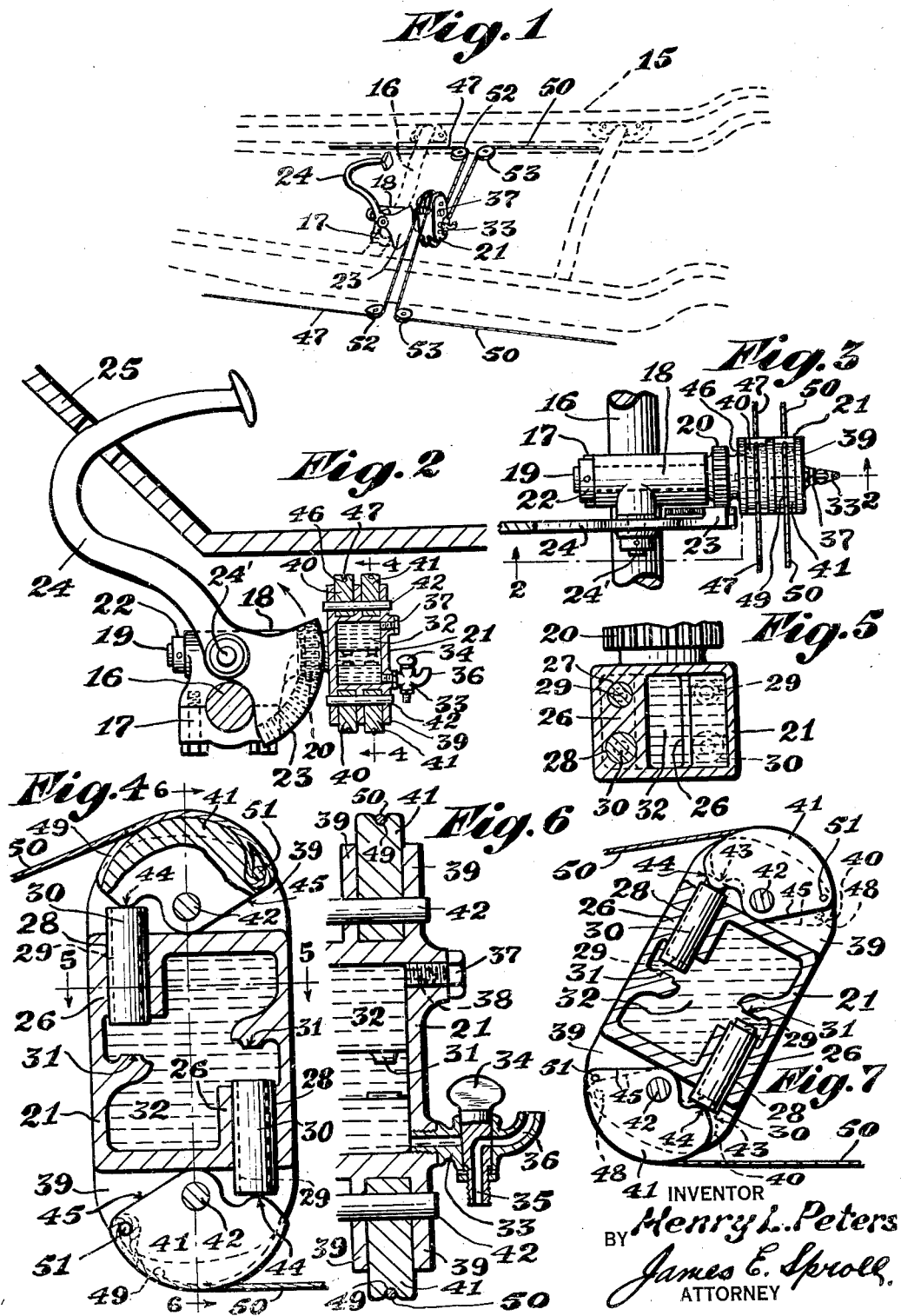
INVENTOR
Henry L. Peters
BY James E. Sproll
ATTORNEY

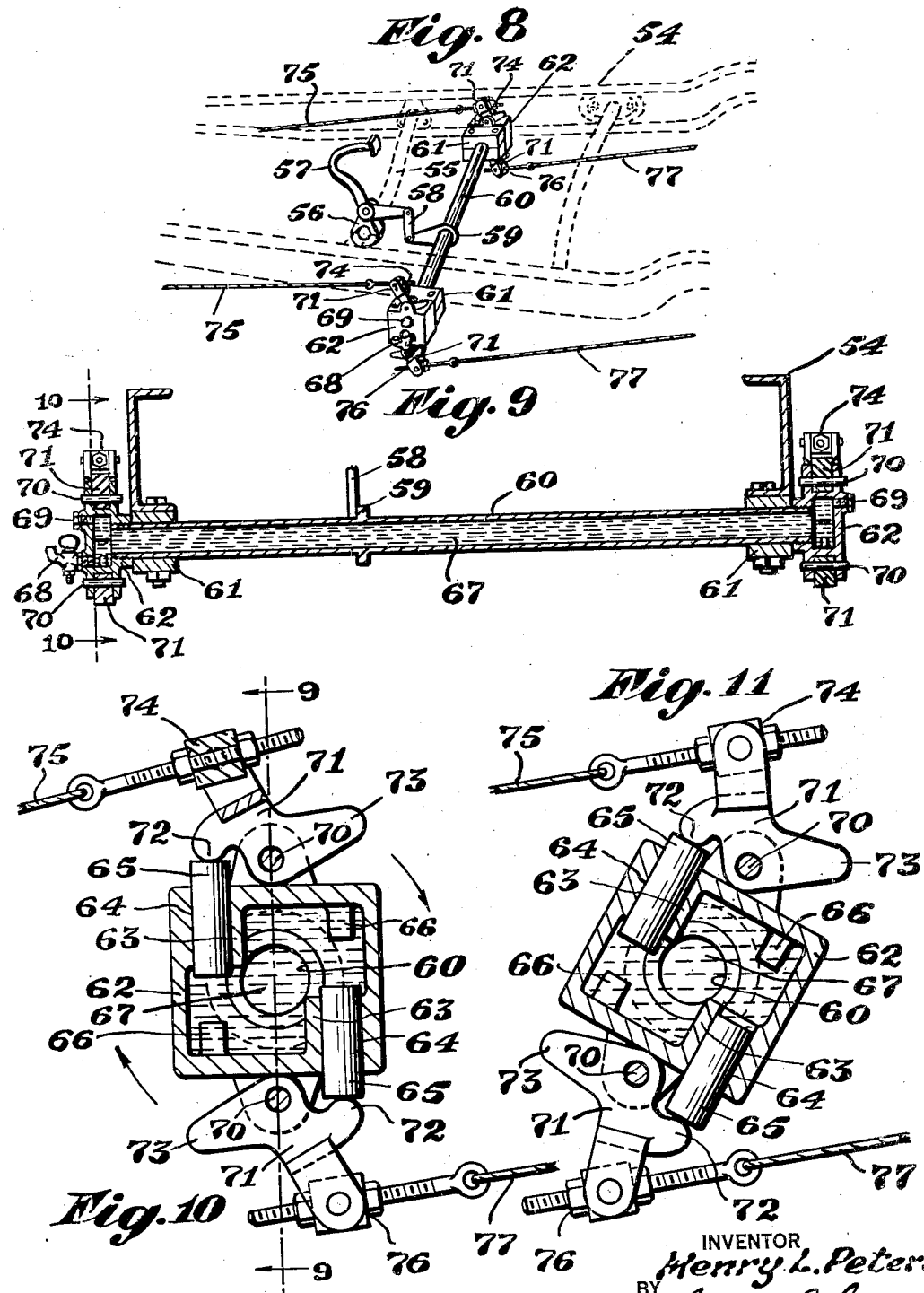

Patented Oct. 17, 1933

1,930,535

UNITED STATES PATENT OFFICE 1,930,535

MECHANICAL BRAKE EQUALIZER

Henry L. Peters, Seattle, Wash.

Application May 21, 1930. Serial No. 454,212

16 Claims. (Cl. 188—204)

This invention relates to improvements in mechanical brake systems for automotive vehicles, and aims primarily to provide a novel mechanical brake equalizer for an automotive vehicle mechanical brake system, especially designed and adapted for automatically equalizing braking pressure upon all the brake drums of said system during braking operations.

Contemplated by the present invention is the provision of a fluid equalizer for a mechanical brake system; that is adapted upon the initial braking operation to automatically take-up any variations existing in the individual brake mechanisms of said system, whereby equalized braking pressure upon all the brake drums thereof is established; that is also adapted during repeated braking operations to remain inactive, insofar as automatic equalizing action is concerned, unless subsequent variations occur for any reason, in which event automatic readjustment of the fluid equalizer takes place to again reestablish equalized braking pressure upon all the drums; that is also adapted in the event of breaking or severance of a connection with one of the brake mechanisms to automatically readjust itself and continue to function as an automatic equalizer for the unaffected brake mechanisms; that is also adapted in the event of excessive leakage of fluid occurring therefrom to still provide braking action for the correlated vehicle, but without automatic equalization of braking pressure at the brake drums; that is also adapted to provide proper braking ratio between the front and rear brake mechanisms of the correlated vehicle; and that is also adapted for initial charging with equalizing fluid and replacement of same in event of leakage without formation of air bubbles or pockets therein; all of which features and objects are to be correlated in the broad aim of enhancing the efficiency of the present fluid equalizer for general use.

The above, and additional objects which will hereinafter be more specifically treated are attained by such means as are shown in the accompanying drawings, described in the following specification and then more clearly pointed out in the claims, which are appended hereto and form part of this specification.

With reference to the drawings, in which there are illustrated several embodiments of the invention, and throughout the several views of which like characters of reference designate similar parts:

Figure 1 is a perspective view of a mechanical brake equalizer comprehended by the present invention, as it would appear when operatively positioned upon the chassis of an automotive vehicle.

Figure 2 is a longitudinal section of the same taken through line 2—2 of Fig. 3.

Figure 3 is a top plan view thereof.

Figure 4 is a vertical transverse section taken through line 4—4 of Fig. 2, certain parts being in elevation.

Figure 5 is a horizontal section taken through line 5—5 of Fig. 4.

Figure 6 is a fragmentary vertical section taken through line 6—6 of Fig. 4.

Figure 7 is a vertical transverse section of the equalizer, as it would appear in a brake applied position with its equalizing plungers disposed in brake compensated relation.

Figure 8 is a perspective view of a slightly modified type of mechanical brake equalizer, as it would appear when operatively positioned upon an automotive vehicle chassis.

Figure 9 is a vertical transverse section of the same taken through line 9—9 of Fig. 10.

Figure 10 is a vertical longitudinal section taken through line 10—10 of Fig. 9, and Figure 11 is a similar section of the equalizer, as it would appear in a brake applied position with its equalizing plungers disposed in brake compensated relation.

Before taking up the detailed description of the drawings, a general exposition of the specific purposes, features and functions of the mechanical brake fluid equalizer evolved by the present invention will be undertaken.

Heretofore in the manual adjustment of mechanical brake systems of automotive vehicles, or the like, it has been practically impossible, due to their mode of construction, to accurately or uniformly adjust such brake systems to secure equal or uniform braking pressure upon all brake drums, and even when the finest possible adjustment at the brake drums has been attained or obtained, flexing of parts, stretching of cables, loose linkage and uneven wear of brake linings in a very short time effectually nullifies such adjustments and positively precludes securing a constant uniform braking pressure upon all the brake drums.

It is therefore, the principal purpose and function of the mechanical brake equalizer of this invention to overcome and obviate these objections and the inherent defects of the automotive mechanical brake systems now in general use, by definitely and effectively insuring of equalized braking pressure upon all brake drums at all times.

Beginning now the more detailed description of the invention by reference to the accompanying drawings, the numeral 15 designates the chassis frame of an automotive vehicle and 16 one of transversely disposed brace rods thereof, whereon a bracket 17 is rigidly clamped having a longitudinally disposed bearing 18 formed upon its upper side, wherein a stub shaft 19 is journalled for oscillative movement. Formed or rigidly mounted upon the rear end of this stub shaft is a spur gear pinion 20 and a casing or housing 21 both of which oscillate therewith. It being here noted that the said shaft, pinion and casing may be formed as an integral unit, in the manner shown, or the same may be fabricated separately and rigidly interconnected, as deemed expedient and found convenient. In the present construction the pinion 20 normally abuts the rear end of the bearing 18, while a collar 22 fixedly secured to the forward end of the stub shaft 19 similarly abuts the adjacent end of said bearing, to thereby prevent axial movement of said shaft therein.

Normally meshing with the spur pinion 20 is a segmental gear 23, which latter is integrally formed upon or is otherwise rigidly connected to a brake pedal 24 pivotally mounted, as at 24', to the side of the bearing 18, said pedal being arranged to extend upwardly through the vehicle foot board 25 in an obvious and well known manner.

Formed within the casing 21, in diagonally opposite relation, are bosses 26, each having spaced parallel bores 27 and 28 formed therein, it being here noted that the bores 28 are preferably of a slightly larger diameter than the bores 27, this for a purpose hereinafter set forth. Slidably disposed within the bores 27 and 28 are plungers 29 and 30, respectively, with their inner ends normally extending slightly within the casing 21, in the manner more clearly shown in Fig. 4, while the outer ends of said plungers normally project outwardly from the ends of said casing, substantially as shown in Figs. 4 and 7. To limit and regulate the inward movement of the plungers 29 and 30 I provide the interior of the casing 21, preferably upon the side walls thereof, with stop bosses 31, which are abutted by the inner ends of the plungers when the latter reach the limit of their inward or advance movement, as will be manifest and apparent by referring to Figs. 4 and 7.

The casing 21 with its correlated plungers 29 and 30 form and provide a closed receptacle for a substantially non-compressible fluid designated in the drawings by the numeral 32. While various fluid substances may be employed, actual experience has shown that fluids such as oil or grease are much better adapted in every way for use in the fluid brake equalizer of the present invention.

Threadedly secured within the rear wall of the casing 21 and communicating with the interior thereof at its lower end is a filling valve 33 for the fluid 32, said valve being preferably of the three-way plug type, the plug 34 of which is provided with an angular inlet bore 35 and having its inlet end exteriorly threaded for the reception of a fluid supply or filling hose, not shown. The valve 33 is also provided with an air venting branch 36 the function and purpose of which will hereinafter be made more manifest and apparent.

Similarly secured within the rear wall of the casing 21 is an air venting plug 37 having an angular air venting port 38 formed therein for communication with the interior of said casing at its upper end for a purpose hereinafter more fully set forth.

Integrally formed upon the upper and lower ends of the casing 21 and extending in longitudinal prolongation therefrom are lugs or ears 39 having segmental rocker members 40 and 41 interposed therebetween, said rocker members being mounted, for free and independent pivotal movement relative to each other, upon pivot pins 42 medially and transversely disposed within the lugs 39.

A rocker member 40 is provided for each plunger 29, and for this purpose such rocker members are undercut one end thereof to form wipers 43, which latter normally abut the outer ends of the plungers 29. Similarly, a rocker member 41 is provided for each plunger 30, and these rocker members are also undercut upon one end thereof to form wipers 44, which normally abut the outer ends of the plungers 30.

The rocker members 40 and 41 at the ends opposite to their wiper ends are provided with faces 45 tangentially disposed relative to their pivotal mountings, said faces being adapted to contact or abut the ends of the casing 21, when the rocker members reach the limit of backward or retractive movement, as will be manifest and apparent by referring the Figs. 4 and 7.

Formed or provided in the peripheries of the rocker members 40 are grooves 46 for the reception or seating therein of the rear end portions of front wheel brake actuating cables 47, said portions having their terminals anchored, as indicated at 48, to the rocker members 40. Similarly, the peripheries of the rocker members 41 are provided with grooves 49 for the reception or seating therein of the front end portions of rear wheel brake actuating cables 50, said portions having their terminals anchored, as indicated at 51, to the rocker members 41.

The front wheel brake actuating cables 47 extend from their correlated rocker members 40 in opposite directions to the sides of the chassis frame 15, whereat said cables pass around sheaves 52, rotatably mounted in any preferred manner upon said chassis frame, and from whence such cables extend forwardly for connection in the usual manner with the front wheel brake mechanisms, not shown.

Similarly the rear wheel brake actuating cables 50 also extend from their correlated rocker members 41 in opposite directions to the sides of the chassis frame 15, whereat said cables pass around sheaves 53, rotatably mounted upon said chassis frame, and from whence said cables extend rearwardly for connection in the usual manner with the rear wheel brake mechanisms, not shown.

In initiating the use of my mechanical brake equalizer, the plug 34 of the filling valve 33 is turned to register the inlet bore 35 thereof with the interior of the casing 21, the air venting plug 37 is unscrewed sufficiently to uncover the outer end of the air venting port 38 thereof, the fluid supply hose is then attached to the threaded inlet end of the plug 34 and the casing 21 completely filled with the fluid 32, which fact is indicated by the latter overflowing at the air venting port 38. When this occurs the air venting plug 37 is screwed home and the plug 34 of the valve 33 is given one-quarter of a turn to cut off communication with the interior of the casing 21. Obviously with the present form of construction and method of completely filling the casing 21 with the fluid 32 all air is expelled from such casing and any tendency for air bubbles or pockets to form therein is positively eliminated, thus materially enhancing the efficiency of the device. The fluid 32 is substantially sealed within the casing 21 and no leakage or escape of such fluid can occur around the plungers 29 and 30.

In the operation of the device, the vehicle brakes are applied by depressing the brake pedal 24, in a well known and obvious manner, thereby imparting through its segmental gear 23 partial rotative movement to the pinion 20 and casing 21. If structural adjustments and conditions were ideal no relative or equalizing movement would occur or be necessary between the plungers 29; 30, the rocker members 40; 41 and the casing 21, during partial rotative movement of the latter, however, in practice structural adjustments and conditions are not ideal for the reasons hereinbefore mentioned and in consequence upon partial rotative movement of the casing 21 being effected, in the manner above described, varying tension upon each of the cables 47 and 50 causes rocking movement of the members 40 and 41, which in turn cause axial displacement of the plungers 29 and 30, which latter co-acting with the fluid 32 function to take up any variations existing in their correlated brake mechanisms, and thus automatically equalize braking pressure upon all the brake drums. Upon release of the brakes, the pedal 24 and casing 21 return to the normal inactive position illustrated in Fig. 2. It is to be here noted, that the plungers 29 and 30 may each assume a different position in their respective bores, as shown in Fig. 7, depending upon the adjustment or condition of their correlated brake mechanisms, and such plungers having once taken up the variations in their correlated brake mechanisms remain in their respective positions during repeated braking operations, until such time as conditions change, for any reason, at which time readjustment of the plungers automatically occurs to take care of such changed conditions.

Should loss or leakage of the fluid 32 from the casing 21 occur for any reason, such lost fluid is replaced by turning the plug 34 so that its bore 35 registers with the air venting branch 36 of the valve 33, as shown in Fig. 6. The fluid supply hose is then attached to the threaded inlet end of the plug 34, the fluid is then fed slowly through the bore 35 to expel the air therefrom through the branch 36 and overflows thereat, whereupon the plug 34 is given one-half turn to register its bore with the interior of the casing 21 and divert the flow of the fluid thereinto. When the casing has been again completely filled the plug 34 of the valve 33 is given one-quarter of a turn to shut off the latter. Manifestly, such method of replacing lost fluid will effectually preclude the possibility of any air bubbles or pockets forming or remaining within the casing 21.

In the present disclosure, the plungers 30 for the rear wheel brake mechanisms have been illustrated and described, as slightly larger in diameter than the plungers 29 for the front wheel brake mechanisms, this for the purpose of providing the proper braking ratio between the front and rear brakes.

Should breakage of one of the cables 47 or 50, or their equivalent occur for any reason, then and in that event, the affected plunger 29 or 30 of the severed or broken cable will move outwardly to the limit of its outward travel, that is until the face 45 of its correlated rocker member abuts the end wall of the casing 21 and concurrently therewith the other plungers will move inwardly to take up the slack created by the affected plunger. Further, should excessive leakage of the fluid 32 from the casing 21 occur for any reason, then and in that event, such leakage will cause all the plungers to move inwardly to the limit of their inward travel, that is until their inner ends abut their respective stop bosses 31. It is to be here noted, that in either of the above mentioned instances the vehicle operator is never without brakes, in the first instance, that is breakage of a cable, braking action is still obtainable, as the equalizer of the invention will continue to function and automatically equalize braking pressure at the three unaffected brake drum mechanisms; while in the second instance, that is leakage of fluid, braking action is still obtainable, but without automatic equalization of braking pressure at the brake drum mechanisms, for the reason that the plungers 29 and 30 are in abutting relation with their respective stop bosses 31 and therefore move as a rigid unit with the casing 21 upon the application of the brakes, as will be manifest and apparent from the foregoing and by reference to the accompanying drawings.

In the slightly modified form of mechanical brake equalizer shown in Figs. 8 to 11, inclusive, the numeral 54 designates an automotive vehicle chassis frame and 55 one of the transversely disposed brace rods of same, whereon a bracket 56 is rigidly clamped, to the side and upper portion of which a foot pedal 57 is pivotally mounted, said pedal being pivotally connected at its lower rear end by a link 58 to the forward end of an arm 59 rigidly mounted upon a transversely disposed hollow or tubular shaft 60 at a point thereon intermediate the length thereof. The hollow shaft 60 is journalled for oscillative movement, adjacent its ends, within brackets 61 rigidly secured in axial alignment upon the lower faces of the sides of the chassis frame 54, substantially in the manner illustrated in Figs. 8 and 9.

Fixedly secured upon the ends of the hollow shaft 60 and communicating therewith are casings or housings 62, each having bosses 63 formed therein in diagonally opposite relation, said bosses having bores 64 extending therethrough, wherein plungers 65 are slidably disposed with their inner ends normally extending slightly within the casings 62, while their outer ends normally project outwardly from the ends of said casings, substantially in the manner illustrated in Figs. 10 and 11. Inward movement of the plungers 65 is limited and regulated by stop bosses 66 formed upon opposing walls in axially aligned relation to said plungers, which latter upon reaching the limit of their inward movement abut said stop bosses in an obvious manner.

The hollow shaft 60 conjointly with the casings 62 form and provide a closed compartment for an equalizing fluid designated by the numeral 67, which latter is injected into such compartment through a filling valve 68 threadedly mounted in one of the casings 62, see Fig. 9, each of said casings also being provided with an air venting plug 69 similarly mounted therein. The valve 68 and the plugs 69 are similar in every respect to the valve 33 and plug 37 hereinbefore described for the equalizer illustrated in Figs. 1 to 7 inclusive.

Pivotally mounted, as at 70, upon the upper and lower ends of the casings 62 are substantially triangular shaped rocker members 71, each of which is individual to a plunger 65 and has a wiper 72 formed upon one end thereof adapted to normally abut the outer end of its correlated plunger, in the manner illustrated in Figs. 10 and 11, while the ends opposite to its wiper end, each of said rocker members has a stop arm or portion 73, adapted to contact or abut the adjacent end of the casing, when such rocker members reach the limit of backward or retractive movement. By referring to the drawings it will be noted, that two of the triangular shaped rocker members 71, one at each side of the chassis frame are directed upwardly, while the other two rocker members, one at each side, are directed downwardly, this for a purpose about to be described. Pivotally connected to the bifurcated apexes of the upwardly directed triangular rocker members 71 are axially adjustable terminals 74 of front wheel brake actuating cables 75, while similarly connected to the bifurcated apexes of the downwardly directed triangular rocker members 71 are axially adjustable terminals 76 of rear wheel brake actuating cables 77. Obviously, any slight slack in the cables 75 or 77 may be rapidly and readily taken up by their correlated adjustable terminals.

In initiating the use of the modified type of equalizer the same is filled with the fluid 67 through its valve 68 and vented by its plugs 69 in identically the same manner to that hereinbefore described for the valve 33, plug 37 and the fluid 32.

In operation depression of the foot pedal 57 causes partial rotative movement of the hollow shaft 60 together with its casings 62, and any variation in the vehicle brake drum mechanisms is simultaneously taken up by the plungers 65 and their rocking members 71 co-acting with the fluid 67 in the same manner as herein set forth for the plungers 29; 30, rocker members 40: 41 and the fluid 32. Upon release of the brakes, the equalizer returns to the normal inactive position illustrated in Fig. 8. As in the type previously described, the plungers 65 of the modified type may each assume a different position in their respective bores 64 depending upon the state of adjustment of their correlated brake drum mechanisms, and such plungers remain in their assumed positions, until such time as conditions change to cause said plungers to automatically compensate for the same.

Replacement of the fluid 67, due to loss or leakage for any reason, is effected in the same manner as that previously described for the fluid 32.

If desired the diameter of the plungers 65 for the rear wheel brakes may be slightly increased, in order to provide the proper braking ratio between the same and the front wheel brakes, substantially as hereinbefore set forth for the first described type of equalizer.

In the event of breakage of a cable 75 or 77, or its equivalent, or the excessive leakage of the fluid 67 for any reason, the modified type of equalizer will continue to function in identically the same manner as herein described for the preferred type of equalizer.

In the present disclosure the fluid equalizers of the invention have been illustrated and described as applied to and embodied in mechanical brake systems of automotive vehicles, but, it is to be understood that the same may be applied to and embodied in mechanical brake systems of devices other than automotive vehicles. Further while I have herein shown and described the use of cables for connecting my equalizers with the brake drum mechanisms, it is to be clearly understood that links or rods may be substituted therefore, the present showing being merely by way of illustration.

Manifestly, therefore, the equalizers of the present invention are extremely simple, compact, durable and economical in construction, are reliable, efficient and positive in action, will not readily get out of order, may be rapidly and readily installed on old or new vehicles and similarly removed therefrom for any reason and may be manufactured at a comparatively low cost.

While I have herein shown and described the invention with sufficient detail to enable those skilled in the art to which it pertains to understand the mode of construction and the principles involved, it is to be understood that there is no intentional limitation herein to the specific form and precise details of construction shown and described, except as expressly defined by the appended claims, and that various modifications of the same may be resorted to without departing from the spirit of the invention or the benefits derivable therefrom. It is also to be understood that certain features of the invention herein disclosed may be employed in and with other combinations than those shown and described.

What I claim as my invention and desire to secure by Letters Patent is:—

1. The combination with a mechanical brake system, of an oscillative non-flexible fluid equalizer unit interposed in and actuated by said brake system for equalizing braking pressure upon all the brake drums thereof.

2. The combination with an oscillative mechanical brake system and the brake drum mechanisms and foot pedal carried thereby, of a non-flexible fluid brake equalizer unit interposed between said brake drum mechanisms and foot pedal for actuation by the latter for equalizing braking pressure upon all brake drums.

3. The combination with a mechanical brake system, of an oscillative non-flexible fluid brake equalizer unit interposed in and actuated by said brake system adapted upon its initial actuation to automatically take-up any variations existing in the brake drum mechanisms of said system for establishing equalized braking pressure upon all of said mechanisms.

4. The combination with a mechanical brake system, of an oscillative non-flexible fluid brake equalizer unit interposed in and actuated by said brake system adapted upon its initial actuation to automatically take-up any variations existing in the brake drum mechanisms of said system for establishing equalized braking pressure upon all of said mechanisms during repeated braking operations, and that is also adapted in the event subsequent variations occur in said system to again automatically reestablish equalized braking pressure upon the brake drum mechanisms thereof.

5. The combination with a mechanical brake system, of an oscillative non-flexible fluid brake equalizer unit interposed in and actuated by said brake system for automatically establishing and maintaining equalized braking pressure upon all the brake drums thereof.

6. A fluid brake equalizer unit for a mechanical brake system comprising an oscillative casing forming a receptacle for a fluid, a plurality of floating free plungers slidably mounted in said casing for co-action with the fluid, and means adapted to oscillate said casing for effecting axial movement of the plungers therein whereby equalized braking pressure is established throughout said system.

7. A fluid brake equalizer unit for a mechanical brake system comprising an oscillative casing forming a receptacle for a fluid, a plurality of free floating plungers slidably mounted in said casing for co-action with the fluid, and means connecting the casing to the brake system and adapted to normally abut said plungers whereby initial actuation of the equalizer effects axial movement of the plungers within the casing for establishing equalized braking pressure throughout said system.

8. A fluid brake equalizer unit for a mechanical brake system comprising an oscillative casing forming a receptacle for a fluid, a plurality of free floating plungers slidably mounted in said casing for co-action with the fluid, means for oscillating said casing, and means abutting said plungers and connected to said brake system whereby initial oscillation of said casing effects axial movement of the plungers relative thereto for establishing equalized braking pressure throughout the brake system.

9. A fluid brake equalizer for a mechanical brake system comprising an oscillative casing forming a receptacle for a fluid, plungers slidably mounted in said casing for co-action with the fluid, means for oscillating said casing, and rocker members carried by said casing and connected with said brake system, said rocker members normally abutting said plungers whereby initial oscillation of the casing effects axial movement of the plungers relative thereto for establishing equalized braking pressure throughout the brake system.

10. A fluid brake equalizer for a mechanical brake system comprising an oscillative casing forming a receptacle for fluid, plungers slidably mounted in said casing for co-action with the fluid, means adapted to oscillate said casing, means for obviating pumping air into said equalizer in advance of the fluid during recharging periods, and means for effecting axial movement of the plungers within the casing whereby equalized braking pressure is established throughout the brake system.

11. A fluid brake equalizer for a mechanical brake system comprising a casing forming a receptacle for a fluid, plungers of different diameters slidably mounted in said casing for co-action with the fluid and for providing proper braking ratio for the several brake mechanisms of the system, and means for effecting axial movement of the plungers within the casing whereby equalized braking pressure is established and maintained throughout the brake system.

12. The combination with a mechanical brake system, of a fluid brake equalizer for equalizing braking pressure upon all brake drums thereof, and means for obviating pumping of air into said equalizer in advance of the fluid when recharging same, said means including a three-way valve wherefrom the air is expelled and sealed by the fluid prior to the actuation of the valve to permit the fluid to flow into the equalizer.

13. The combination with a mechanical brake system, of a fluid brake equalizer for automatically establishing and maintaining equalized braking pressure upon all the brake drums thereof, and means for obviating pumping air into said equalizer in advance of the fluid when recharging the same, said means including a three-way valve wherefrom the air is expelled and sealed by the fluid flowing therethrough prior to the actuation of the valve to permit the fluid to flow into the equalizer.

14. The combination with an automotive vehicle mechanical brake system having four wheel brakes, of a fluid brake equalizer for automatically establishing and maintaining equalized braking pressure upon the front wheel brakes thereof and similarly upon the rear wheel brakes of said system, said equalizer including plungers of one diameter for the front wheel brakes and plungers of a relatively greater diameter for the rear wheel brakes whereon the same fluid pressure is maintained for providing the proper braking ratio between said front and rear wheel brakes.

15. A fluid brake equalizer for a mechanical brake system comprising a casing forming a receptacle for a fluid, plungers slidably mounted in said casing for co-action with the fluid, means for effecting axial movement of the plungers within the casing whereby equalized braking pressure is established and maintained throughout the brake system, a filling valve connected to said casing, and air venting means for said casing to effect expulsion of the air therefrom by the fluid.

16. A fluid brake equalizer for a mechanical brake system comprising a casing forming a receptacle for a fluid, plungers slidably mounted in said casing for co-action with the fluid, means for effecting axial movement of the plungers within the casing whereby equalized braking pressure is established and maintained throughout the brake system, a three-way charging and recharging valve connected to said casing at one end thereof wherefrom the air is expelled and sealed by the fluid flowing therethrough prior to the actuation of the same to permit the fluid to flow into said casing, and an air venting plug connected to the opposite end of said casing wherethrough air is expelled from the casing by the fluid flowing thereinto.

HENRY L. PETERS.